Patented May 1, 1928.

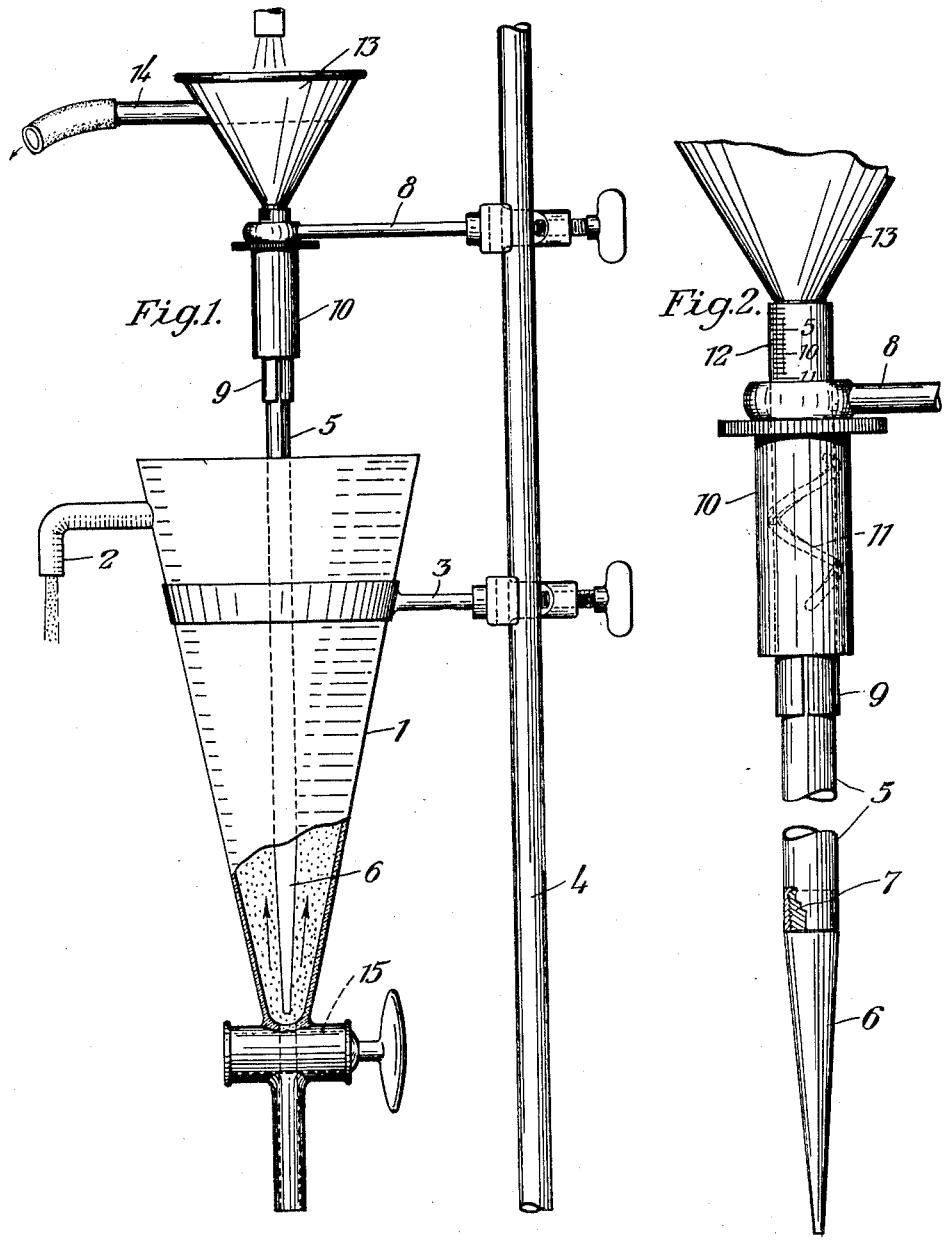

1,667,783

UNITED STATES PATENT OFFICE.

HERMANN HARKORT, OF BERLIN-TEGEL, GERMANY.

APPARATUS FOR DETERMINING THE DEGREE OF FINENESS OF PULVERULENT OR FINE GRANULAR MASSES BY MEANS OF SUSPENSION.

Application filed December 8, 1926, Serial No. 153,440, and in Germany October 14, 1926.

Devices for the determination of the degree of fineness of pulverulent or fine granular masses are known, in which, in an elutriating tank, the internal diameter of which changes with the height, a cup-shaped testing glass for example, is arranged a nozzle tube extending right to the bottom thereof. Through this nozzle tube an uninterrupted current of liquid is introduced into the mass deposited in the cup-shaped testing glass, so that the finer constituents thereof are separated by floating upwards from the heavier constituents and have an opportunity to flow away in the upper part of the cup-shaped glass. The separation is effected by the shape of the glass, which widens conically upwards, whereby the velocity of the ascending current of liquid, that effects the floating up of the light constituents, becomes less as it ascends, so that the current of liquid is only capable of conveying out of the mass right up to the outlet constituents of special fineness according to the diameter of the nozzle tube, that is, according to the pressure head. The constituents of coarser grain, on the other hand, remain behind in the glass.

Such devices have hitherto consisted almost entirely of glass, a glass nozzle tube with a definite nozzle aperture being arranged in an indiarubber or cork plug and only being supported upon the cup-shaped glass by means of a plate placed upon the rim of the glass. This arrangement exhibits a series of defects which considerably impair the accuracy and quickness of the individual measurements. Thus, the nozzle tube, and consequently the outflow nozzle itself, in consequence of the insecure supporting in the elutriating vessel, do not always take up the same position for the individual measurements in relation to the bottom of the elutriating vessel, so that in the case of the individual measurements different velocities of flow and accordingly different elutriation results are the consequence. Since the nozzle tube is fixedly mounted in its support, a plurality of pieces of apparatus, with nozzles of different outlet diameters, or at least a plurality of nozzle tubes, had to be employed for washing out substances of different degrees of fineness from one and the same mass, the bringing of the mass out of the cleansing container for the determination by weight of the residue by inspissation, and the renewed introduction thereof into the washing container, and still more, the rewashing, required time and frequently occasioned certain difficulties. It was moreover never at all certain that in the case of the fresh apparatus the nozzle of greater diameter corresponded as regards its position relative to the bottom of the elutriating container, to those magnitudes that had been adjusted when elutriating the finer substances.

A construction is also already known wherein a glass nozzle tube is independently supported on a stand or column and connected by a hose pipe with a liquid storage vessel. The washing out of substances of different degrees of fineness is here attempted by adjusting the liquid storage reservoir to different heights. Very great heights of the liquid storage reservoir are here required, in order to obtain even moderately differentiated washing, as a result of which the apparatus becomes unwieldy, and furthermore, after it has been taken to pieces for the determination by weight, it is difficult to adjust the point of the nozzle accurately again, and there remains the aforementioned disadvantage consisting in the difficulty of rewashing after the thickening of the residue by evaporation.

These disadvantages are obviated by the present invention. For this purpose the nozzle tube is made of metal or of some other material that can be accurately machined, and is provided with an exchangeable tip, so that with the same nozzle tube a member of different nozzle tips, increasing in diameter of outlet aperture by one millimetre for example, may be employed. The nozzle tube is moreover supported independently of the elutriating container and is arranged adjustably. In the case of a particularly practical constructional form, moreover, an elutriating vessel in the form of a cup-shaped testing glass is provided at the lower end with a closable outlet, in order to enable the residue, after the washing out of the finer constituents, to be transferred in a simple manner into another vessel for rocking or for other purposes.

By this construction the possibility is provided of determining simply the specific gravity of the liquid separated out, together with the residue, without evaporation, and calculating therefrom the weight of the residue. The residue may in this case be returned immediately with the liquid for further washing out in the washing container, whereby particularly quick working is rendered possible.

The invention is illustrated by way of example in the accompanying drawings wherein:

Fig. 1 is a side elevation of the apparatus according to the invention, partly in section, and Fig. 2 is a partial elevation of a detail on a larger scale.

Fig. 1 shows an elutriating vessel 1 in the form of a cup-shaped testing glass, with an overflow pipe 2, secured by means of a holder 3 to a stand or column 4. According to the invention the nozzle tube 5 is made of metal or of some other material capable of being accurately machined and is designed for the reception of nozzle tips 6 with different outlet apertures. The nozzle tips may be connected in any convenient manner with the nozzle tube, as for example by means of a screw-thread 7.

It is essential for the nozzle tube to be supported independently of the elutriating vessel 1, preferably for example by means of a holder 8 on the same column 4, and also for it to be adjustable in height. For this purpose the nozzle tube 5 is pushed into a slotted sleeve or the like 9 and is slidably supported therein with a certain amount of friction. This sleeve 9 is supported on the holder 8 by means of a socket or muff 10 in such a way that the sleeve 9 is slidable in the muff 10. This sliding may be effected by any convenient means by rotating the muff 10, as for example by means of a helical groove 11, in which there engages a suitable pin or screw-thread on the other member, a rotation of the sleeve 9 being prevented by suitable means. A graduation 12 is provided on the sleeve 9 for the purpose of fine adjustment. To the other end of the nozzle tube 5 is fitted a funnel 13 with a pipe union 14 for discharging the superfluous liquid.

In the case of the particularly advantageous constructional form illustrated in the drawings, an outlet member such as a cock 15 is provided at the lower end of the elutriating vessel 1.

The method of working of the apparatus is as follows:—

In order to wash out of one and the same mass constituents of different degrees of fineness in succession, the nozzle tube is first provided with a nozzle tip 6 of a particular passage aperture, such as one millimetre for example, and is so adjusted in the elutriating vessel that it stands with its nozzle tip upon the bottom of the elutriating vessel. By turning the muff 10 the tip of the nozzle tube is then drawn away from the bottom of the elutriating vessel by a certain amount, which can be read off on the graduation 12, three millimetres for example. After filling in the mass to be elutriated, the current of liquid is turned on and the fine constituents which float up in this liquid current are floated away and discharged through the overflow 2. When these constituents are completely removed it is only necessary to exchange the said nozzle tip 6 for a nozzle tip with a wider outlet aperture, of 1.5 millimetres for example, and then to wash out the coarser substances by the same process. Owing to the adjusting device described and to the method of supporting the individual parts of the apparatus a guarantee is given that the fresh nozzle tip 6 can be brought into exactly the same position in relation to the bottom of the elutriating vessel, so that the washing out of the somewhat coarser particles proceeds under exactly the same conditions, but with a somewhat strengthened flow of liquid, in consequence of the larger outlet aperture, while the pressure remains the same. As compared with known constructions, where the higher liquid velocity for the washing out of the coarser constituents has to be obtained by raising the pressure, the apparatus according to the present invention has the advantage of greater simplicity and of a greater range of variations in the velocity of the liquid.

What I claim is:—

1. Apparatus for determining the degree of fineness of pulverulent or fine-grained masses by suspending them in a liquid, consisting in the combination of a conical elutriating vessel, a nozzle tube, extending from above substantially down to the bottom of the elutriating vessel, a funnel for liquid at the upper end of the nozzle tube, a tubulure on the liquid funnel for the exit of the superfluous liquid, an adjusting device for the adjustment of the nozzle tube in relation to the elutriating vessel, an exchangeable nozzle tip at the lower end of the nozzle tube, means for releasably securing in the nozzle tube a plurality of nozzle tips of different passage apertures in succession, and an overflow on the elutriating vessel for the discharge of the liquid containing the fine upwardly floating particles.

2. Apparatus for determining the degree of fineness of pulverulent or fine-grained masses by suspending them in a liquid, consisting in the combination of a conical elutriating vessel, a nozzle tube, extending from above substantially down to the bottom of the elutriating vessel, a funnel for liquid at the upper end of the nozzle tube, a tubulure on the liquid funnel for the exit of the superfluous liquid, a clamping member surrounding the nozzle tube and permitting longitudinal displacement thereof, a collar rotatably supported and causing when rotated a displacement of the clamping member with the nozzle tube, a graduation on the clamping member, an exchangeable nozzle tip at the lower end of the nozzle tube, means for releasably securing in the nozzle tube a plurality of nozzle tips of different passage apertures in succession, and an overflow on the elutriating vessel for the discharge of the liquid containing the fine upwardly floating particles.

3. Apparatus for determining the degree of fineness of pulverulent or fine-grained masses by suspending them in a liquid, consisting in the combination of a conical elutriating vessel, an outlet at the lower end of the elutriating vessel with a shut-off member, a nozzle tube, extending from above substantially down to the bottom of the elutriating vessel, a funnel for liquid at the upper end of the nozzle tube, a tubulure on the liquid funnel for the exit of the superfluous liquid, a clamping member surrounding the nozzle tube and permitting longitudinal displacement thereof, a collar rotatably supported and causing when rotated a displacement of the clamping member with the nozzle tube, a graduation on the clamping member, an exchangeable nozzle tip at the lower end of the nozzle tube, means for releasably securing in the nozzle tube a plurality of nozzle tips of different passage apertures in succession, and an overflow on the elutriating vessel for the discharge of the liquid containng fine upwardly floating particles.

In testimony whereof I have signed my name to this specification.

HERMANN HARKORT.